United States Patent
Bosco (12)

(10) Patent No.: US 6,335,963 B1
(45) Date of Patent: Jan. 1, 2002

(54) SYSTEM AND METHOD FOR PROVIDING NOTIFICATION OF A RECEIVED ELECTRONIC MAIL MESSAGE

(75) Inventor: Joseph A. Bosco, Chicago, IL (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/982,313

(22) Filed: Dec. 1, 1997

(51) Int. Cl.[7] ................................................. H04M 1/64
(52) U.S. Cl. ................................. 379/88.12; 379/88.11; 379/88.13; 379/88.15
(58) Field of Search ........................... 379/88.01, 88.05, 379/88.11, 88.12, 88.13, 88.14, 88.15, 88.6, 88.22, 100.08; 340/825, 825.25; 455/412, 414; 709/206

(56) References Cited

U.S. PATENT DOCUMENTS

| | | | | |
|---|---|---|---|---|
| 5,406,557 A | * | 4/1995 | Baudoin | 379/79 |
| 5,475,738 A | * | 12/1995 | Penzias | 379/67 |
| 5,479,411 A | * | 12/1995 | Klein | 379/88 |
| 5,524,137 A | * | 6/1996 | Rhee | 379/67 |
| 5,621,727 A | * | 4/1997 | Vaudreuil | 370/60 |
| 5,712,901 A | * | 1/1998 | Meermans | 379/88 |
| 5,944,786 A | * | 8/1999 | Quinn | 709/206 |
| 5,974,449 A | * | 10/1999 | Chang et al. | 709/206 |
| 5,995,594 A | * | 11/1999 | Shaffer et al. | 379/88.12 |
| 6,061,718 A | * | 5/2000 | Nelson | 709/206 |
| 6,072,862 A | * | 5/2000 | Srinivasan | 379/100.08 |

* cited by examiner

Primary Examiner—Scott L. Weaver (57) ABSTRACT

An electronic mail system provides a user with notification of a received e-mail message without requiring the user to call into their e-mail service provider. A user registers with an e-mail service to be notified of a received e-mail message, and the user is then notified of the received e-mail message by the desired system, such as telephone, voice mail, or a pager.

12 Claims, 9 Drawing Sheets

| ISP DATABASE | | | | | | | | | | |
|---|---|---|---|---|---|---|---|---|---|---|
| PHONE NUMBER | PASSWORD | ACCOUNT NUMBER | E-MAIL ADDRESS | BILL STATUS | MODEM TYPE | PC/MAC | ADDRESS | CITY/STATE | UNIQUE ID | WHAT TO SEND |
| | | | | | | | | | | |
| | | | | | | | | | | |
| | | | | | | | | | | |

SYSTEM AND METHOD FOR PROVIDING NOTIFICATION OF A RECEIVED ELECTRONIC MAIL MESSAGE

BACKGROUND OF THE INVENTION

The present invention relates generally to the field of electronic mail, and more particularly to a system and method for providing notification of a received electronic mail message to the recipient of the message.

An ever-increasing number of people worldwide have access to the Internet and on-line services via various channels. For example, America On-Line, Prodigy, and others provide subscribers to their services, or end users, with channels of access to the Internet. In most instances, these channels of access also provide some form of electronic mail (e-mail) service as part of their offering of on-line services. In their corresponding e-mail services, when an end user receives an e-mail message at their service provider mailbox, the message remains in the end user's e-mail message mailbox until the end user calls into the provider and is notified that a message is waiting to be opened. For example, after calling into the provider, a message may appear on the screen saying "You have mail." Alternatively, an end user, after calling into the provider, may be notified by a voice message, which is provided by triggering a voice prompt located in the end user's computer. This prompt would generally be downloaded by the end user at the time of registration with the e-mail provider.

Thus, users of these e-mail services only realize that an e-mail message has been received by calling into the service provider. Consequently, unless an end user is currently calling into the service provider when an e-mail message is received, the end user will be unaware of a newly received e-mail message.

SUMMARY OF THE INVENTION

Systems and methods consistent with the present invention provide an end user with notification or an alert of a received e-mail message without requiring the end user to call into the e-mail service provider. An end user first registers with an e-mail service to be notified or alerted of a received message. After registering for the notification/alert system, the end user is notified or alerted of the received e-mail message by telephone, voice mail, or a pager. In addition to being notified or alerted, the end user may also receive information regarding the content of the received e-mail message.

A method, consistent with the present invention, for notifying or alerted an end user of a received electronic mail message includes the steps of receiving an electronic mail message for the end user, designating a communication system for notifying or alerting the end user of the received electronic mail message, and notifying or alerting the end user of the received electronic mail message through the designated communication system.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DESCRIPTION OF THE PREFERRED EMBODIMENT

Reference will now be made to preferred embodiments of this invention, examples of which are shown in the accompanying drawings and will be obvious from the description of the invention. In the drawings, the same reference numbers represent the same or similar elements in the different drawings whenever possible.

Figure 1:
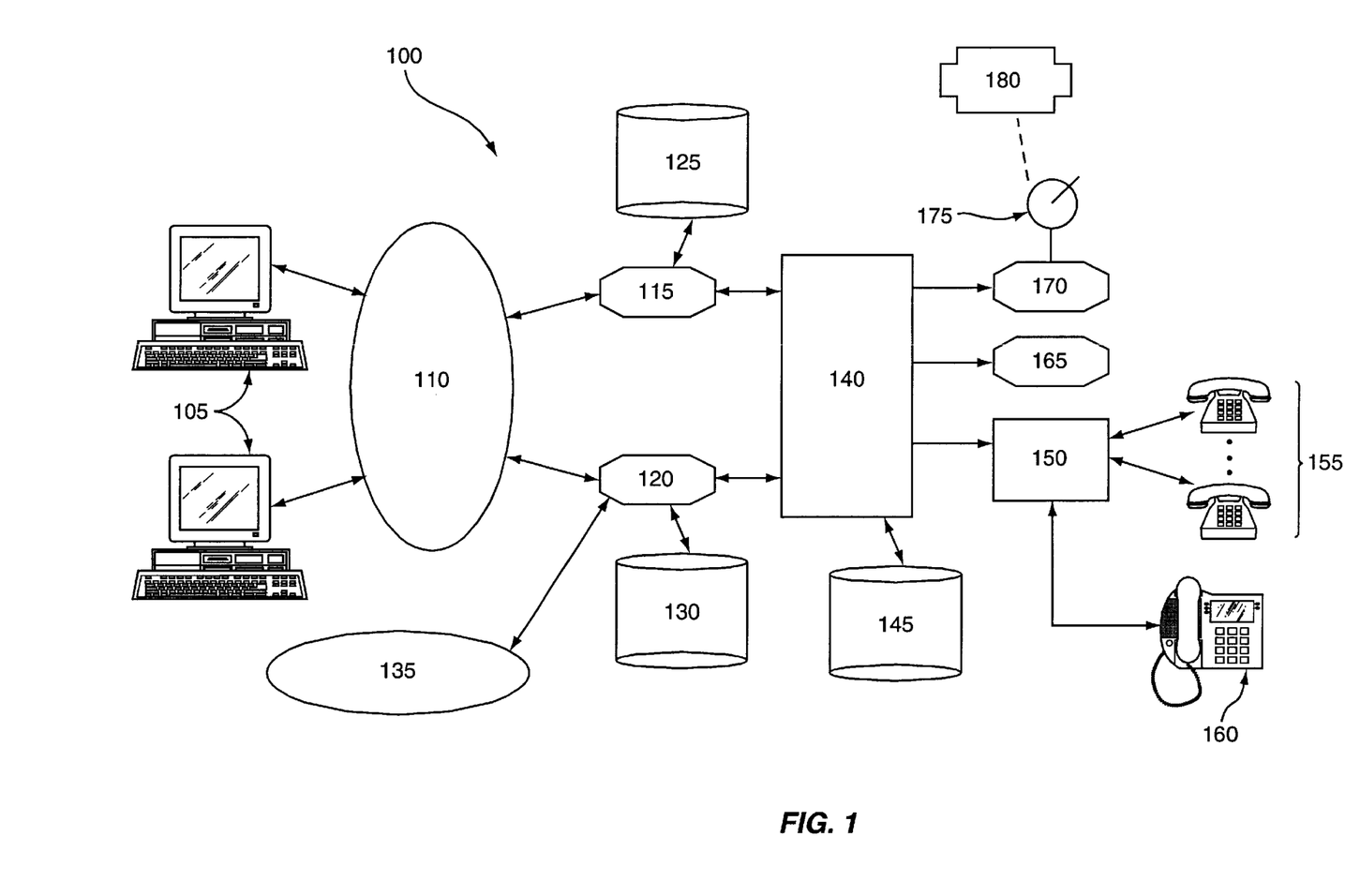
FIG. 1 is a block diagram of a communication system consistent with the present invention.

FIG. 1 is a block diagram of an e-mail notification communication system 100, consistent with the present invention, for providing a user with notification or an alert that an e-mail message has been received. Communication system 100 includes a plurality of end user systems 105, a telephone network 110, Internet service providers (ISP) 115 and 120 having respective ISP databases 125 and 130, and the Internet 135. Communication system 100 also includes an e-mail server 140 having a corresponding e-mail server database 145, a central office 150 connected to a plurality of end user telephones 155 and an end user station 160, a voice mail server 165 having a corresponding database (not shown), and a paging system 170 having an antenna 175 for communication with an end user pager 180.

End user systems 105 are generally personal computer (PC) type systems. Each end user system includes a modem or its equivalent for accessing information through telephone network 110. For example, end user systems 105 can call into ISP 115 or ISP 120 through telephone network 110 to gain access to the Internet 135 or to their e-mail messages.

Figure 2:
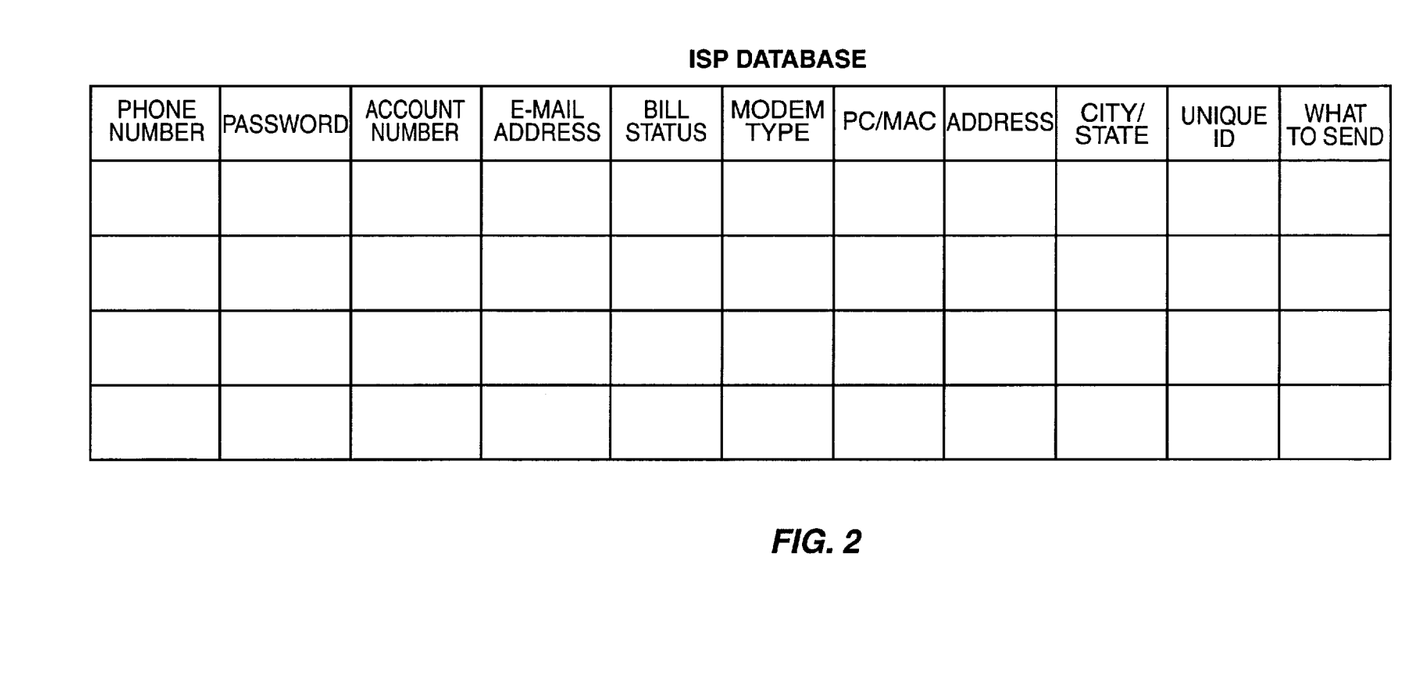
FIG. 2 is a diagram of the Internet service provider (ISP) database of FIG. 1

ISPs 115 and 120 each include ISP databases 125 and 130, respectively. As shown in FIG. 2, these databases hold information regarding each of the registered users for the particular ISP. In particular, ISP databases hold identification information including the user's phone number, account number, e-mail address, home address, city and state, and a unique identifier (ID). The databases also hold characteristic information about a registered user including a password for access to the ISP, the user's bill status, the type of modem and computer (e.g. PC or Mac), and information about what to send (WTS information) for notification. E-mail messages may also be stored in the ISP databases 125 and 130, or alternatively in a separate database dedicated to storing e-mail messages.

In addition to providing access to the Internet 135, ISPs 115 and 120 are also connected to e-mail server 140, which provides an end user with e-mail notification or alerts. E-mail server 140 also includes an e-mail server database 145, which includes information for identifying the end user receiving the e-mail message and by what mode of communication the end user is to be notified or alerted of the received e-mail message. E-mail server 140 also includes a local number portability database (not shown), which holds the numbers for contacting the central office that services the telephone number of the end user.

E-mail server 140 is also connected to a variety of different communication systems that can be used to notify or alert an end user of a received e-mail message. These communication systems provide different modes of notification and include, for example, central office 150 for communication by telephone, voice mail server 165 for communication through voice mail, and paging system 170 for communication by pager. As shown in FIG. 1, central office 150 is connected to two different types of telephones. End user telephones 155 are standard telephones that do not include any text display. End user station 160, however, not only includes the functions of standard telephones, but also includes a text display capable of displaying text messages. Voice mail server 165 holds voice mail messages for the end user and includes a voice mail database (not shown) for holding end user information. Paging system 170 includes an antenna 175 or other equivalent transmitting device for sending messages to a pager 180.

As described above, end users conventionally must access their ISP to read their e-mail messages, as well as to determine if any new e-mail messages have been received since the end user's last access to the ISP. By using the e-mail notification system consistent with the present invention, however, an end user can be notified or alerted immediately of a received e-mail message without calling into an ISP.

Figure 3:
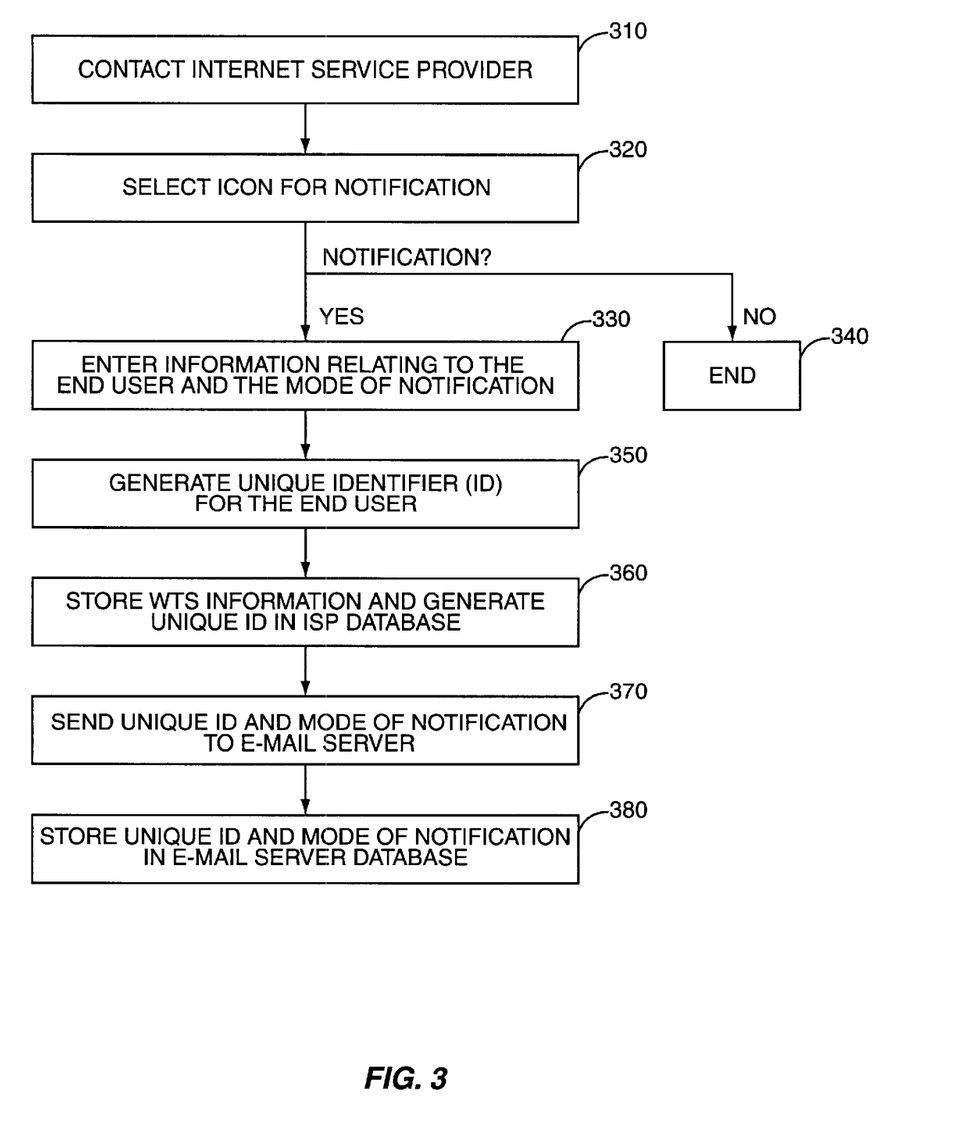
FIG. 3 is a flowchart showing steps, consistent with the present invention, for registering an end user to use the e-mail notification system.

FIG. 3 is a flowchart showing steps, consistent with the present invention, for registering an end user to use the e-mail notification system. Initially, a user calls into an ISP (step 310). For example, a user can call into ISP 115 or 120 with end user system 105. If the user is not already registered with the particular ISP, the user must do so before registering to use the e-mail notification system. When registering originally with an ISP, the user provides basic identification information, such as phone number and home address information, as well as characteristic information, such as the modem and computer type of end user system 105. The ISP stores this information in the ISP database and issues the user a password, account number, and e-mail address. This issued information is also stored in the ISP database.

After the user is registered with the ISP, the user selects an icon or its equivalent located at the ISP web site or home page to register for the e-mail notification system (step 320). In response to the selection of the icon, an interface or window appears. This interface provides detailed information about how the e-mail notification system works and what a user needs to have to register for the system. In addition, the system through the interface asks if the user wants to register for the e-mail notification system. If not, the user can exit the interface and return to the ISP web site or home page (step 340). If the user does wish to register, however, the user so indicates, for example, by selecting an "OK" button.

If the user elects to register for the e-mail notification system, a new window or interface appears, which calls for the user to provide identification information and to choose a desired mode of alert or notification (step 330). The identification information, such as the user's account number, is necessary to access the user's information held in the ISP database. For the mode of or alert notification, the user can choose among a variety of communication systems. Among the modes of communication, the user may select to be notified or alerted by telephone, voice mail, or pager, or any other telecommunication system.

In addition to selecting the mode of notification, the user can select different characteristics for the notification message. The characteristics vary depending on the mode of communication selected and the capabilities of the end user's communication equipment. The sum of the characteristics of the notification message selected by the user constitute the WTS information held in ISP databases 125 and 130.

For notification by telephone, the options available to the user depend on the type of telephone the user possesses. Standard telephones, such as end user telephones 155, may only be capable of generating a stutter tone at the end user's telephone to indicate that an e-mail message has been received. More complex telephones, however, such as end user station 160, may have the capability of displaying all or part of the text of the message on a display at the end user's telephone.

For notification by voice mail, the standard or default option provides a voice message simply indicating that an e-mail message has been received at the ISP of the end user. Other options for voice mail include converting the received e-mail message from text into voice. This conversion is preferably performed by e-mail server 140. Alternatively, voice mail server 165 could convert the text of the message into voice after receiving the complete text message from e-mail server 140.

Finally, for notification alert by pager, the default option sends a phone number to the end user's pager, which the end user would recognize as indicating that an e-mail message has been received at the ISP used by the end user. Options for more advanced pagers having, for example, text display capability may allow for all or part of the text of the received e-mail message to be sent to the pager of the end user. Thus, like for notification alert by telephone, the options available for pagers depend on the type of pager the end user possesses. These options for each mode of notification or alert are exemplary only. Other options are available consistent with the capabilities of the particular mode of notification or alert.

After completing the selection of the mode of notification or alert and the characteristics of the notification message, the ISP generates a unique identifier (ID) for the user (step 350). The unique ID and the WTS information are then stored in the ISP database (step 360). In addition, the unique identifier and the mode of notification or alert are sent to e-mail server 140 (step 370) for storage in e-mail server database 145 (step 380).

Figure 4:
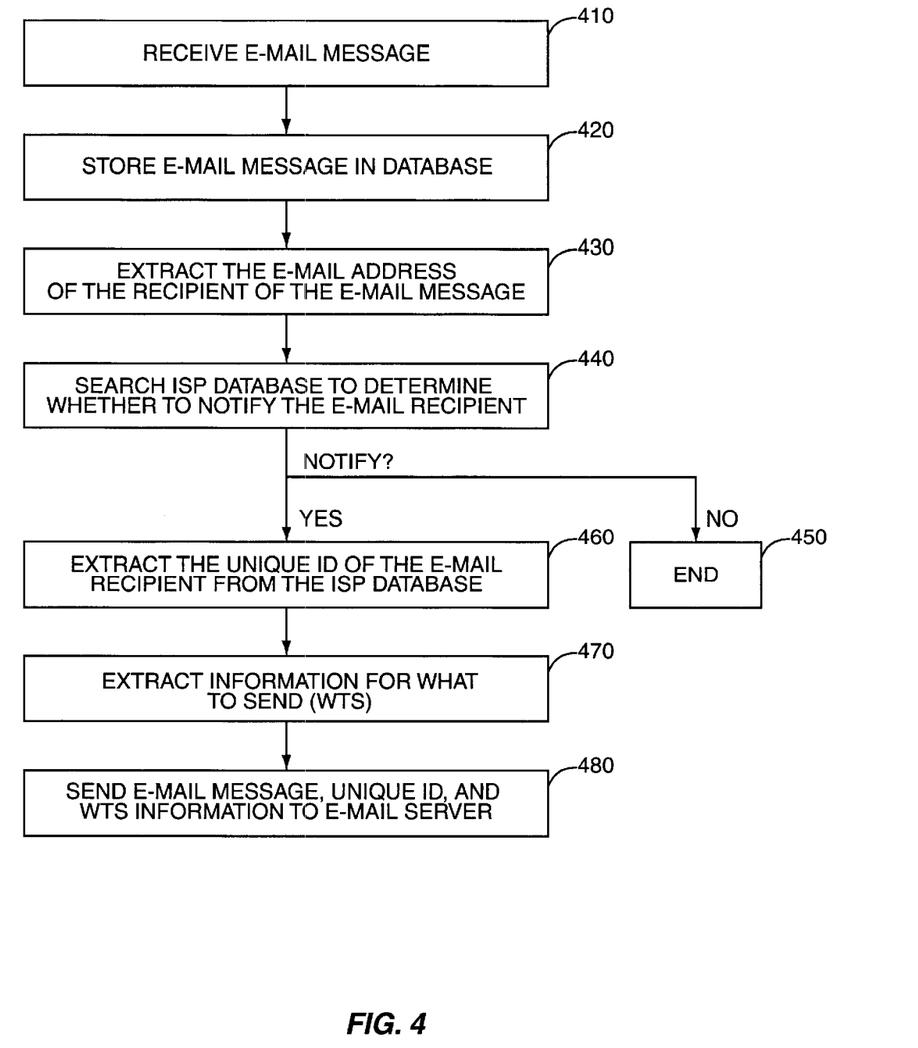
FIG. 4 is a flowchart showing steps, consistent with the present invention, taken by an ISP for processing an e-mail message received by an end user registered with the e-mail notification system.

Once the unique ID and mode of notification or alert is stored in e-mail server database 145, the reconfiguration of communication system 100 is complete for notifying/alerting the user of a received e-mail by the designated mode of notification or alert. FIG. 4 is a flowchart showing steps, consistent with the present invention, for processing an e-mail message received by an ISP. First, an e-mail message is delivered to the end user's e-mail address in the ISP used by the end user (step 410). The e-mail message may arrive, for example, via the Internet 135. The ISP then stores the received e-mail message in either a database dedicated to storing e-mail messages or in a separate part of the ISP database for later access by the recipient end user (step 420). After receiving the e-mail message, the ISP extracts the e-mail address of the recipient (step 430). The extracted address is then used to search the ISP database to determine whether the recipient of the e-mail message has registered for e-mail notification or alert (step 440).

If the recipient has not registered for e-mail notification or alert, then the ISP does nothing more (step 450). However, if the recipient has registered for e-mail notification or alert, the ISP extracts the unique ID from the ISP database, which was generated when the recipient registered to get e-mail notification (step 460). The ISP also extracts the WTS information alerts from the ISP database (step 470).

After the ISP extracts the appropriate information from the ISP database, it sends the entire e-mail message, the unique ID and the WTS information to e-mail server 140 (step 480). E-mail server 140 uses the unique ID and the WTS information to determine how and what information is to be sent to the recipient of the e-mail message who has registered for e-mail notification or alert.

Figure 5:
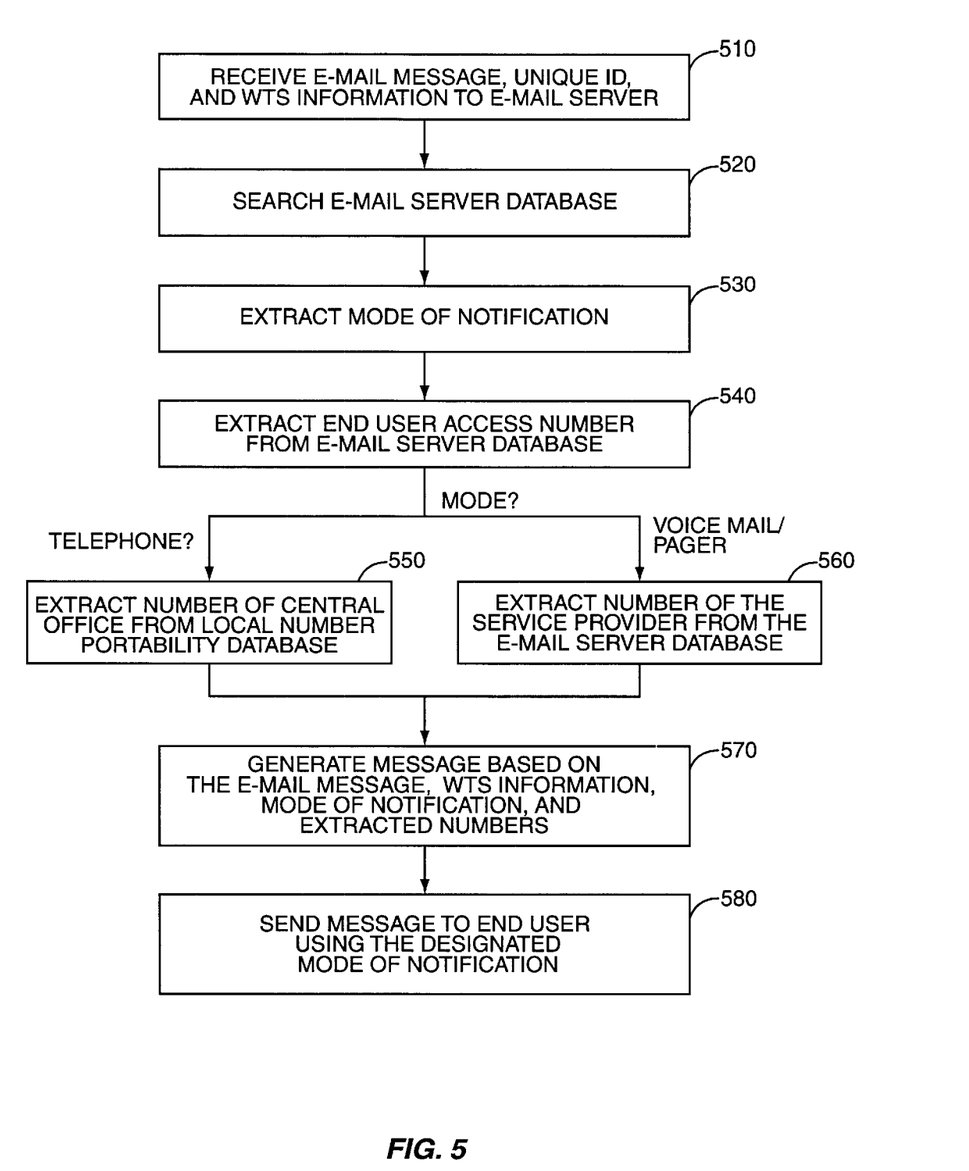
FIG. 5 is a flowchart showing steps, consistent with the present invention, for notifying an end user registered with the e-mail notification system.

FIG. 5 is a flowchart showing steps, consistent with the present invention, for notifying or alerting an end user who has registered to use the e-mail notification/alert system. After the ISP processes a received e-mail message, e-mail server 140 receives the e-mail message, the registered end user's unique ID, and the WTS information (step 510). E-mail server 140 uses the unique ID to search e-mail server database 145 for the mode of notification or alert designated by the end user when registering for e-mail notification or alerts (step 520). E-mail server 140 then extracts the mode of notification or alert corresponding to the unique ID (step 530).

E-mail server 140 also extracts the number for accessing the telephone, voice mail or pager of the end user (step 540). If the mode of notification or alert is by telephone, then e-mail server 140 accesses the local number portability database and uses the telephone number of the end user to determine which central office to contact (step 550). For notification/alert by voice mail or pager, e-mail server 140 uses the unique ID to extract from e-mail server database 145 the number for the voice mail server or paging system used by the end user (step 560).

Once e-mail server 140 possesses the e-mail message, the WTS information, the mode of notification or alert, and the number for accessing the communication systems and the end user, it generates a message that is used by the selected mode of notification or alert to notify/alert a user of a received e-mail message (step 570). The format or envelope for this notification message preferably has a format consistent with the protocol used by each particular mode of notification or alert. For example, central office 150 may require a complex protocol, such as TCP/IP, whereas voice mail server 165 or paging system 170 may use a simpler protocol such as X25. Using individualized envelopes created by e-mail server 140 obviates the necessity of customizing each mode of notification or alert to understand a format generalized for all modes of notification or alert.

Although the format or envelope of the notification message may vary, the content of the message will generally be similar for each mode of notification or alert. In particular, e-mail server 140 uses the WTS information to determine what part, if any, of the e-mail message should be included in the notification or alert message. After the notification message has been generated, e-mail server 140 uses the extracted number of the communication system a associated with the selected mode of notification or alert to send the notification message to that communication system (step 580).

Figure 6:
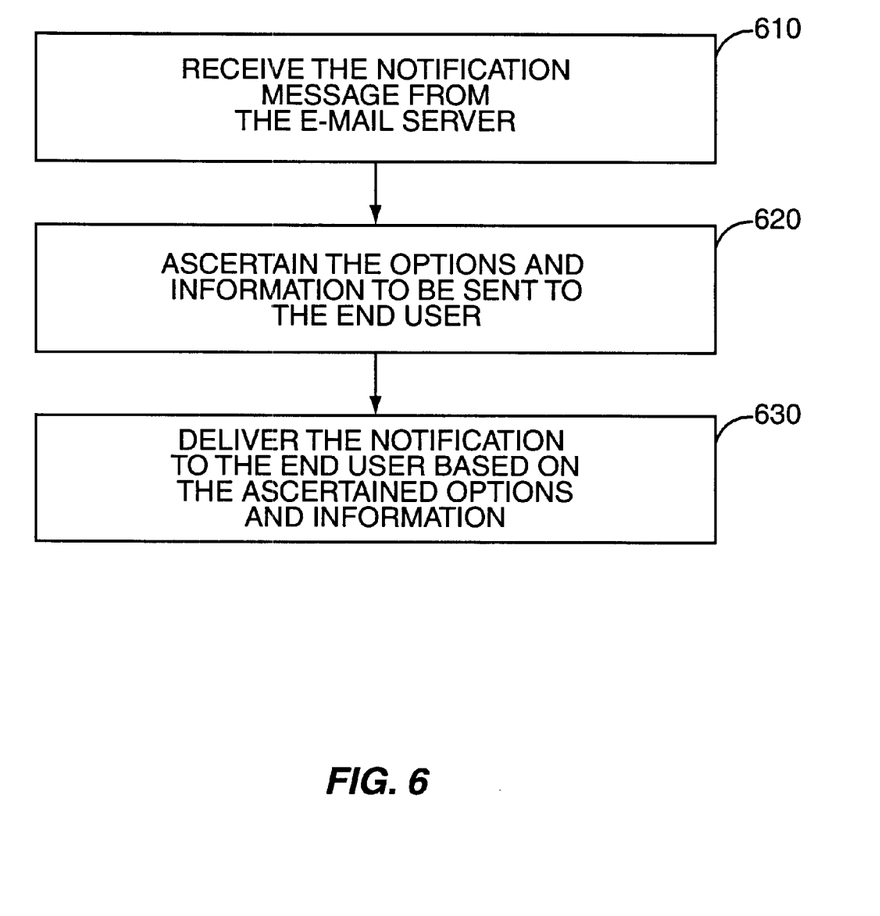
FIG. 6 is a flowchart showing steps, consistent with the present invention, for processing a notification message for delivery to the end user.

For each communication system, the specific manner of processing the notification message and then delivering notification or alert to the end user may vary. However, the general steps taken by the particular communication system are the same. FIG. 6 shows steps, consistent with the present invention, for processing a notification message for delivery to the end user. The communication system associated with the selected mode of notification or alert first receives the notification message from e-mail server 140 (step 610). For example, the notification message could be received by central office 150, voice mail server 165 or paging system 170.

The communication system receiving the notification message then determines what should be sent to the end user based on the content of the notification message (step 620). In particular, the communications system examines the notification message to ascertain which options have been selected by the end user for being notified or alerted. Based on the selected options, the communication system delivers the appropriate form of notification or alert to the end user that an e-mail message has been received (step 630).

Figure 7:
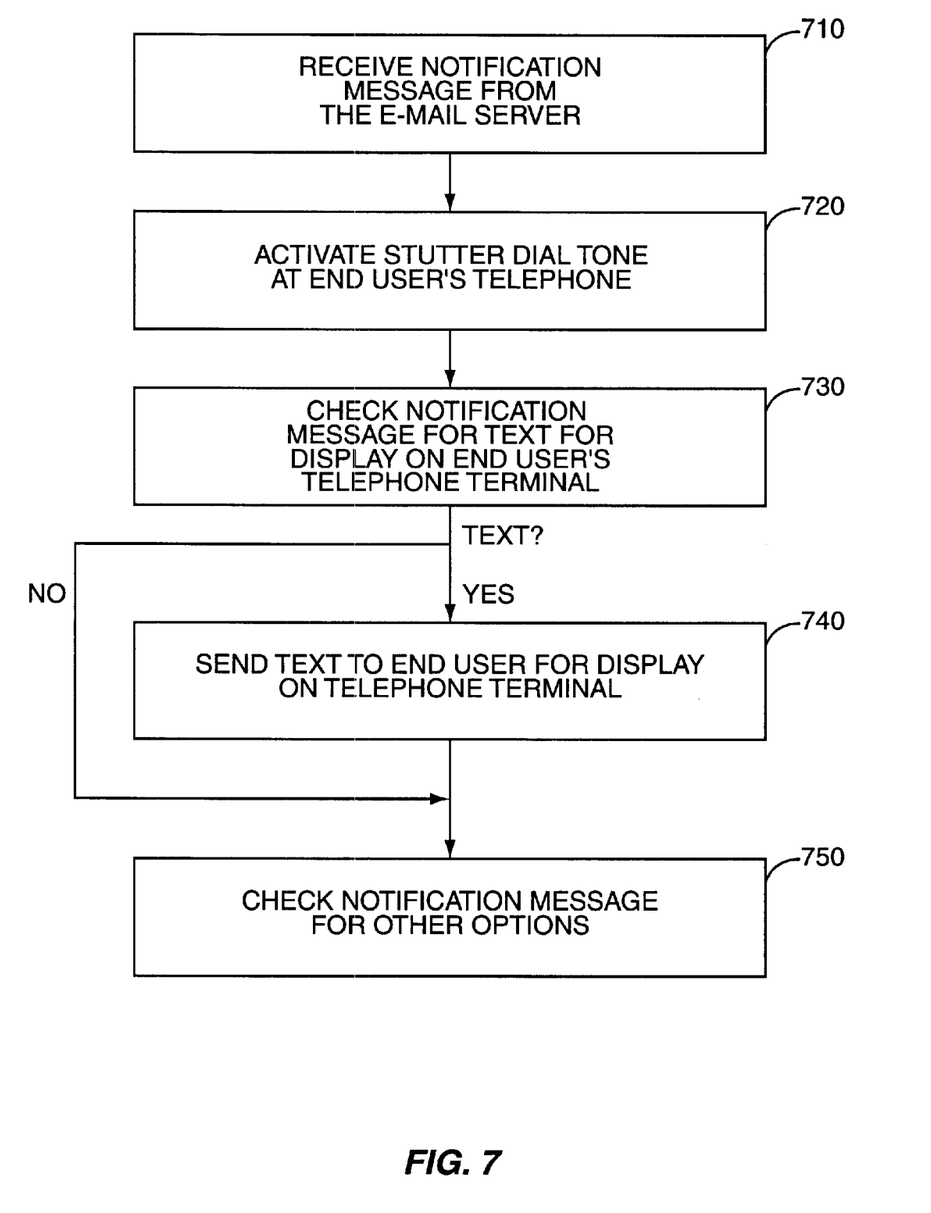
FIG. 7 is a flowchart showing steps, consistent with the present invention, for processing a notification message in a central office.
Figure 8:
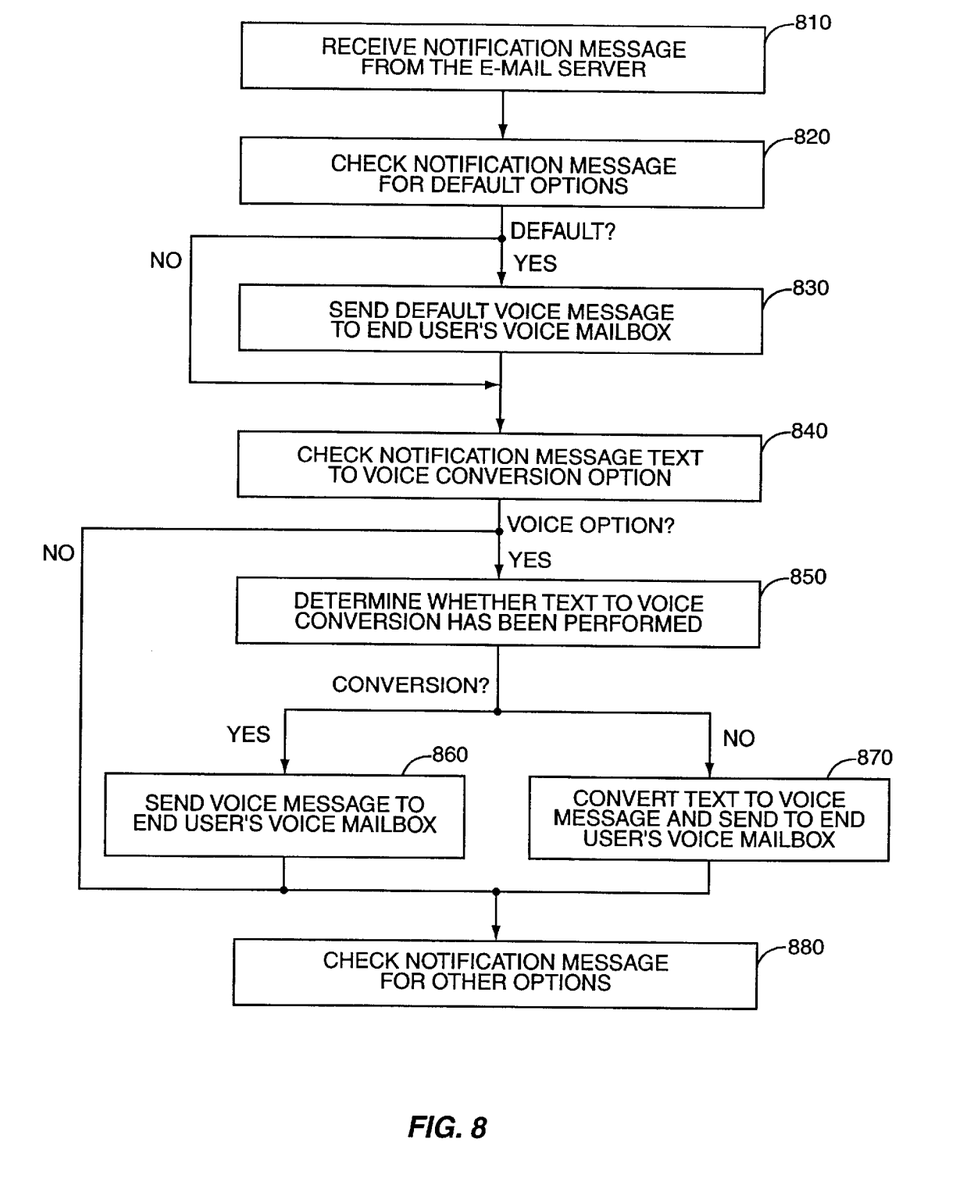
FIG. 8 is a flowchart showing steps, consistent with the present invention, for processing a notification message in a voice mail server.
Figure 9:
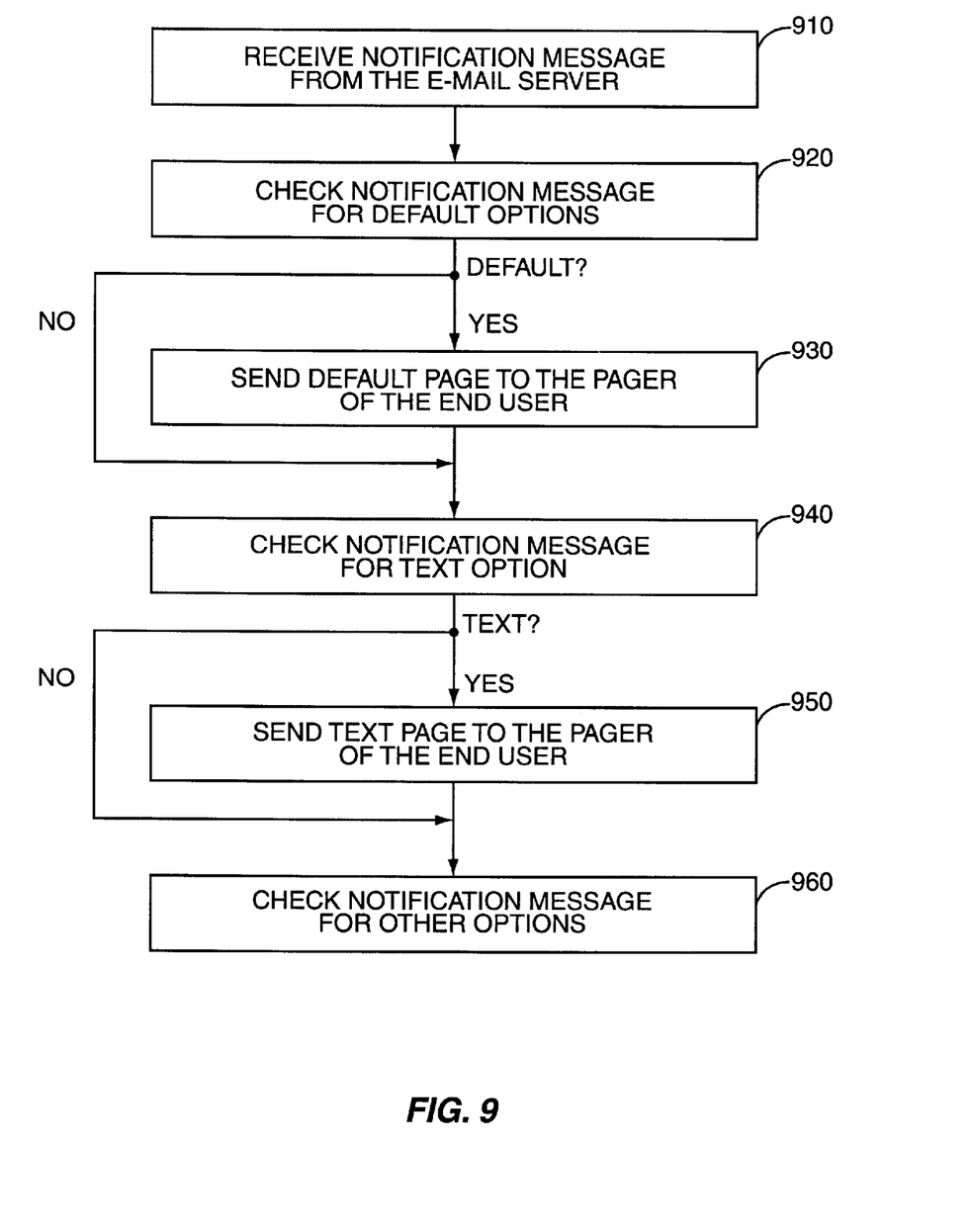
FIG. 9 is a flowchart showing steps, consistent with the present invention, for processing a notification message in a paging system.

FIGS. 7–9 show steps, consistent with the present invention, for processing a notification message in central office 150, voice mail server 165, and paging system 170, respectively. As shown in FIG. 7, central office 150 receives the notification message from e-mail server 140 (step 710). Central office 150 then examines the message to determine the manner in which the end user is to be notified/alerted. First, central office 150 extracts the telephone number of the end user from the notification message and uses that number to activate the code for generating a stutter dial tone at the telephone of the end user (step 720). As a result, if the end user hears a stutter dial tone, the end user knows that an e-mail message has been received.

In addition, central office 150 then determines what options and information have been included in the notification message. For example, central office 150 could check whether the notification message includes text from the received e-mail message that is to be displayed on the telephone terminal of the end user (step 730). This text information may include any information relating to the e-mail message, such as the date and time the e-mail message was received, the address of the person sending the e-mail message, part or all of the text of the e-mail message, or some combination thereof. If text information is found, then central office 150 sends the text to the end user for display on the telephone terminal (step 740). If no text information is found, however, then no text is sent to the end user. Central office 150 also checks for any further options or information, consistent with the capabilities of telephone communication, that may be included in the notification message (step 750).

For voice mail server 165, the steps for processing the notification message are similar to the steps taken by central office 150. As shown in FIG. 8, voice mail server 165 also receives the notification message from e-mail server 140 (step 810). After receiving the notification message, voice mail server 165 checks it to see whether a default option has been included (step 820). If so, voice mail server 165 puts a message, such as "You have an e-mail message," in the end user's voice mailbox using the access number of the end user to determine in which voice mailbox to put the message (step 830).

Voice mail server 165 also examines the notification message for a text to voice conversion option (step 840). If the conversion option is included in the notification message, voice mail server then determines whether the conversion from text to a voice message has already been performed (step 850). Voice mail server 165 forwards the voice message to the end user's voice mailbox if e-mail server 140 has already converted the text to a voice message (step 860). Otherwise, voice mail server 165 itself converts the text information in the notification message into a voice message, which is sent to the end user's voice mailbox (step 870). Like central office 150, voice mail server 165 checks for other notification options that are consistent with the capabilities of voice mail server 165 (step 880).

Finally, FIG. 9 shows the steps taken by paging system 170, consistent with the present invention, for processing the notification message and notifying/alerting the end user. Like central office 150 and voice mail server 165, paging system 170 first receives the notification message from e-mail server 140 (step 910). Also like the other communication system, paging system 170 includes a variety of notification or alert options, generally depending on the capabilities of end user's pager 180. For example, paging system 170 may check the notification message for the simplest or default option (step 920). The default option is for a phone number to be sent to end user's pager 180 that the end user recognizes as indicating an e-mail message has been received. If the notification message includes the default option, paging system 170 sends the default page to end user's pager 180 by way of antenna 175 (step 930).

In addition to the default option, paging system 170 also checks for a text option, which is available for more advanced pagers having, for example, text display capability (step 940). The text option allows all or part of the text of the received e-mail message to be sent to end user's pager 180. If the notification message includes the text option, paging system 170 sends the text of the e-mail message included in the text option to end user's pager 180 (step 950). Paging system 170 may also check for other notification or alert options consistent with the capabilities of paging system 170 and pager 180 (step 960).

CONCLUSION

A communication system, consistent with the present invention, provides an end user with notification or alerts of a received e-mail message without requiring the end user to call into their e-mail service provider. The end user can be notified or alerted of the received e-mail message by telephone, voice mail, or a pager. In addition, the user can select different options regarding the information provided in the notification or alert consistent with the capabilities of the user's communication equipment.

It will be apparent to those skilled in the art that various modifications and variations can be made to disclosed embodiments of the present invention without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their fall range of equivalents.

What is claimed is:

1. A method of alerting an end user of a received mail message, comprising the steps of:

receiving an electronic mail message for the end user;

extracting information associated with the end user from the electronic mail message to identify the end user;

identifying a preferred communication modality for alerting the end user of the received electronic mail message based on the extracted information, the preferred communication modality being selected by the end user; and providing an alert to the end user of the received electronic mail message through the identified communication modality.

2. The method according to claim 1, wherein the identifying step includes the substep of:

selecting the communication modality from at least one of a telephone, a voice mail system, and a pager.

3. The method according to claim 1, further comprising the steps of:

determining whether the end user receiving the electronic mail message requires an alert; and refraining from alerting the end user of the message if the end user did not request to be alerted.

4. The method according to claim 1, wherein the determining extracting step includes the substeps of extracting the electronic mail address of the end user from the received electronic mail message; and checking a database using the extracted address to decide whether the end user requires an alert.

5. The method according to claim 4, further comprising the steps of:

generating a unique identifier from the database if the end user requires an alert; and ascertaining the identified communication modality based on the unique identifier.

6. The method according to claim 2, wherein the providing step includes the substep of sending a voice message to the end user indicating that an electronic mail message has been received if the identified communication modality is voice mail.

7. The method according to claim 2, wherein the providing step includes the substeps of converting the text of the received electronic mail message to a voice mail message if the identified communication modality involves voice mail; and sending the voice message to the end user.

8. The method according to claim 2, wherein the providing step includes the substep of sending a page message to the end user indicating that an electronic mail message has been received if the identified communication modality includes a pager.

9. The method according to claim 8, wherein the sending step includes the substep of providing the page message with at least part of the text of the received electronic mail message for display.

10. A method of notifying an end user of a received mail message, comprising the steps of:

receiving an electronic mail message for the end user;

extracting information associated with the end user from the electronic mail message to identify the end user;

identifying a communication system for notifying the end user of the received electronic mail message based on the extracted information, wherein the communication system is selected from at least one of a telephone, a voice mail system, and a pager; and notifying the end user of the received electronic mail message, if the identified communication system includes a pager, by sending a page message with a predetermined number indicating that an electronic mail message has been received to the end user.

11. A method of notifying an end user of a received mail message, comprising the steps of:

receiving an electronic mail message for the end user;

extracting information associated with the end user from the electronic mail message to identify the end user;

identifying a communication system for notifying the end user of the received electronic mail message based on the extracted information, wherein the communication system is selected from at least one of a telephone, a voice mail system, and a pager; and notifying the end user of the received electronic mail message through a stutter tone at a telephone unit of the end user to indicate that an electronic mail message has been received if the identified communication system includes a telephone.

12. A method of notifying an end user of a received mail message, comprising the steps of:

receiving an electronic mail message for the end user;

extracting information associated with the end user from the electronic mail message to identify the end user;

identifying a communication system for notifying the end user of the received electronic mail message based on the extracted information, wherein the communication system is selected from at least one of a telephone, a voice mail system, and a pager; and notifying the end user of the received electronic mail message through providing a stutter tone at a telephone unit of the end user and sending at least part of the text of the received electronic mail message for display on a telephone unit of the end user to indicate that an electronic mail message has been received if the identified communication system includes a telephone.

* * * * *